E. SPIES.

Pantaloons and Other Garments.

No. 9,038. Reissued Jan. 6, 1880.

Witnesses

John Bussius

B. J. Sgam

Inventor

Edward Spies per Wm. R. Singleton

Atty

N. PETERS, PHOTO-LITHOGRAPHER, WASHINGTON, D. C.

UNITED STATES PATENT OFFICE.

EDWARD SPIES, OF WASHINGTON, DISTRICT OF COLUMBIA.

PANTALOONS AND OTHER GARMENTS.

SPECIFICATION forming part of Reissued Letters Patent No. 9,038, dated January 6, 1880.

Original No. 220,885, dated October 21, 1879. Application for Reissue filed November 10, 1879.

*To all whom it may concern:*

Be it known that I, EDWARD SPIES, of Washington, District of Columbia, have invented certain new and useful Improvements in Pantaloons and other Garments; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to improvements in wearing apparel; and the object of the same is to provide means for tightening and loosening the waist of pantaloons, &c.

Heretofore such devices have been made by sewing a strap to each side of the back of the garment, one of these straps having a buckle on one of its ends, or by a short strap and buckle or equivalent take-up device extending from the side seam to a distance from the middle on the same side of the garment, and having two inclined gores in the rear of the side seam.

The first method is objectionable, as it gives an unsightly appearance to the garment by bunching the material in the seat. The second is also objectionable, for the reason that when the side straps are tightened they draw the material in a bunch at the side and twist the legs of the garment out of shape, which makes them hang awkwardly on the wearer.

The object of the present invention is to provide means which can be easily operated, and by which the garment may be tightened without discomfort to the wearer, and without making any unsightly bulk of the material at either the back or sides of the garment, and also without causing the garment to twist out of shape.

To accomplish this purpose the gores must be located immediately on each side of the middle seam of the back of the garment, and as near thereto as the conformation of the person may require, being generally about two inches from the middle seam, thus making the space between the gores about four inches, more or less, so that they come over the small of the back, and not over the hips near the side seams, which it is desirable to avoid, so that the fold of the gore will be over the small of the back, and not press on the hips, as they do in the other method, where the gores are in the rear of the side seam.

Figure 1:
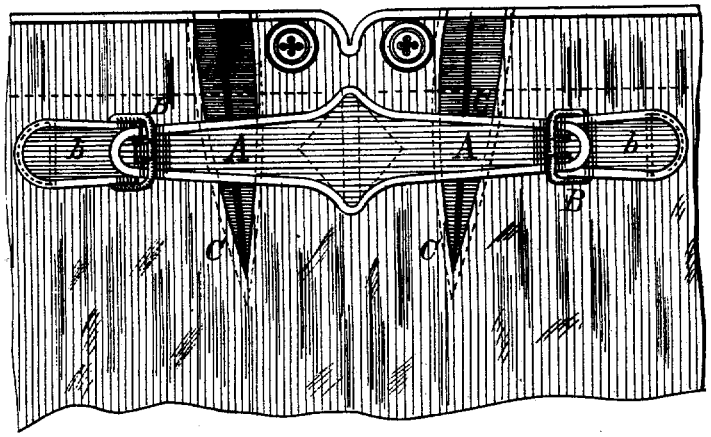
Figure 2:
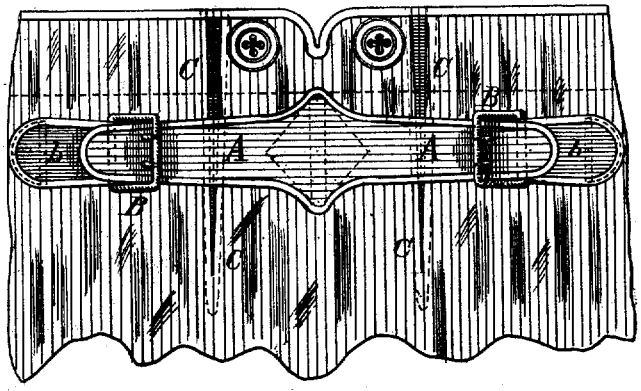

In the annexed drawings, Figure 1 is a view showing the straps loosened, and Fig. 2 a view showing the same drawn tight.

A represents the tightening-strap, which is sewed or otherwise secured immediately on the middle seam of the back of the garment, as shown.

B B are buckles attached to the small straps *b b*, which are secured to the garment a little behind the side seams and below the waistband.

C C are the gores, which are inserted through and from the waistband and located on each side of the middle seam of the back at about the distance of two inches, more or less, to suit the form of the wearer, being always between the middle seam and the buckles B B.

When gores have been used heretofore they were placed at the side of the garment, and, by tightening the straps, were made to bunch and bag in such manner as to present an unsightly appearance. By my construction this is prevented. The gore is made to lap over in a positive manner by making a crease in the center of the gore, and to lap over one-fourth or more, also, by inserting a piece of stiffening equal to one-fourth or more of the width of the gore. The lap can be lengthened or shortened by lengthening or shortening the stiffening.

The advantages of my strap above all others are apparent, because, first, it takes less time, trouble, and material to make it, which, in the eyes of a workman, are very important features; and, second, it is easily operated, and does not allow the buckles to hitch off to one side, as the old method does, while being hurriedly tightened.

Having thus described my invention, what I claim as new, and desire to secure by Letters Patent, is—

1. In pantaloons and other garments provided with gores C, the double strap A, attached to the middle seam of the garment and adapted to pass across the gores and engage with the buckles B B on small straps *b b*, substantially as and for the purpose described.

2. The gores of garments formed by a middle crease or stiffening-piece, to fold by a positive movement in the direction required, substantially as and for the purpose described.

3. The combination, in pantaloons and other garments provided with back gores, C C, near and on each side of the middle seam, of double strap A, attached to the middle seam of the garment, buckles B B, and small straps *b b*, substantially as and for the purpose described.

In testimony that I claim the foregoing I have hereunto set my hand this 5th day of November, 1879.

EDWARD SPIES.

Witnesses:
T. J. EDWARDS,
J. H. JOHNSTON.